United States Patent
Bencze

[15] 3,679,800
[45] July 25, 1972

[54] BICYCLOALKYL PHENOXYALIPHATIC ACID-COMPOSITIONS

[72] Inventor: William Laszlo Bencze, New Providence, N.J.

[73] Assignee: Ciba Corporation, Summit, N.J.

[22] Filed: April 3, 1968

[21] Appl. No.: 718,374

[52] U.S. Cl.............................424/267, 424/248, 424/250, 424/274, 424/308, 424/311
[51] Int. Cl. .......................................................A61k 27/00
[58] Field of Search....................................................424/308

[56] References Cited

UNITED STATES PATENTS 3,206,501  9/1965  Masuda ..............................424/308
3,332,842  7/1967  Bencze ..............................424/308

Primary Examiner—Albert T. Meyers
Assistant Examiner—Daren M Stephens
Attorney—Harry Goldsmith, Joseph G. Kolodny, Bryant W. Brennan and Edward J. Sites

[57] ABSTRACT

Bicycloalkyl-phenoxy-aliphatic acids, e.g., those of the formula

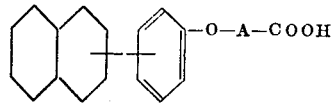

A = alkylene or alkenylene and their functional derivatives are hypocholesterolemic agents.

2 Claims, No Drawings

BICYCLOALKYL PHENOXYALIPHATIC ACID-COMPOSITIONS

SUMMARY OF THE INVENTION

The present invention concerns and has for its object the provision of new bicycloalkyl-phenoxy-aliphatic acids of Formula I $$R—Ph—O—A—COOH \quad (I)$$

in which R is a 5 to 7-ring-membered bicycloalkyl radical, Ph is a phenylene radical and A is a lower alkylene or alkenylene radical, of their functional derivatives, as well as of corresponding pharmaceutical compositions and of methods for the preparation of these products. Said compositions are useful hypocholesterolemic agents useful in the treatment or management of arteriosclerosis.

DESCRIPTION OF THE PREFERRED EMBODIMENTS

The bicycloalkyl radical R may contain up to 14 carbon atoms and whose five to seven membered rings share one to four, preferably two, carbon atoms. It may be unsubsituted or substituted by one or more than one of the same or of different substituents, preferably lower alkyl groups, e.g. methyl, ethyl, n- or i- propyl or -butyl. Such radicals R are above all 1- or 2- decahydronaphthyl, 3-, 4-, 5-, 6-, 7- or 8- methyl-, 4- or 8-ethyl-, 5-i-propyl-, 4,4- or 6,7- dimethyl- or 4,5,8-trimethyl- decahydro-1- or 2-napthyl, but also 1- or 2-pentalenyl, 2- or 7-norbornanyl, bornyl, 1-, 2-, 4- or 5-hexahydroindanyl, 3-, 4- or 7-methyl- or 5,6-dimethyl-hexahydro-1- or 2-indanyl, 2-,3-,6- or 8-bicyclo[3,2,1] octyl, 2- or 8- spiro[4,5] decyl, 3-,4- or 9- decahydroazulyl, 2-bicyclo [2,2,2] octyl or 1,4-dimethyl-2-bicyclo[2,2,2] octyl, 2-, 3- or 9-bi-cyclo[3,3,4] nonyl, 2- or 3- spiro[5,5] undecyl, 1-, 2- or 7- bicyclo [5,4,0] undecyl, 2-, 3- or 7- bicyclo [3,2,2] nonyl, 3-, 8- or 10- bicyclo [4,3,1]·decyl, 1-, 2- or 3- dodecahydro-heptalenyl. The term "lower", referred to above and hereinafter in connection with organic radicals or compounds respectively, defines such with up to seven, preferably up to four, carbon atoms.

The 1,2-, 1,3- or preferably 1,4-phenylene radical Ph also is unsubsituted or substituted in the other four positions by one or more than one of the same or of different substituents, such as lower alkyl, e.g. methyl, ethyl, n- or i-propyl or -butyl, lower alkoxy, e.g. methoxy, ethoxy, n- or i-propoxy or -butoxy, halogeno, e.g. fluoro, chloro or bromo, trifluoromethyl, nitro or amino, preferably di-lower alkylamino, e.g. di-methylamino or diethylamino; preferably up to two such substituents are present.

A lower alkylene radical A preferably is methylene or 2,2-propylene, but also, for example, 1,1- or 1,2-ethylene, 1,1-, 1,2-, or 1,3-propylene, 1,1-, 1,2-, 2,2-,1,3-, 2,3- or 1,4-butylene, 1,1-, 1,2-, 3,3- or 2,4-pentylene, 3,3- or 3,4-hexylene or 4,4-heptylene. A lower alkenylene radical A is, for example, ethenylene, 1,2-, 2,3- or 1,3-prop-1-enylene, 1,4-but-1-enylene, 1,4- or 2,3-but-2-enylene, 2,3-pent-2-enylene, 1,3-hex-2-enylene or 1,1-hept-3-enylene.

Functional derivatives of the acids of Formula I are preferably their esters, for example, their lower alkyl, e.g. methyl, ethyl, n- or i-propyl, n-, sec. or tert. butyl esters, or substituted lower alkyl, particularly tert. amino-lower alkyl or lower alkoxy-lower alkyl esters, wherein the tertiary amino group above all is di-lower alkylamino, e.g. dimethylamino or diethylamino, lower alkyleneimino, e.g. pyrrolidino or piperidino, or mono-aza-, oxa- or thia-lower alkyleneimino, such as piperazino, 4-lower alkyl-piperazino e.g. 4-methyl-or 4-ethyl-piperazino, morpholino or thiamorpholino, wherein 2 heteroatoms are separated by at least two carbon atoms. Other functional derivatives of said acids are, for example, unsubstituted or substituted amides, e.g. mono- or dilower alkylamides, lower alkyleneamides,mono-aza-, oxa- or thia-lower alkyleneamides or the nitrile.

The compounds of this invention possess valuable pharmacological properties. For example, they cause a reduction of the cholesterol level in the blood, as can be demonstrated in animal tests using, for example mammals, e.g. rats or dogs, as test objects. The compounds of the invention are advantageously administered orally, e.g. to male rats in the form of aqueous or polyethyleneglycol 400 solutions or suspensions by stomach tube or to male Beagle dogs by gelatine capsules, for example, in the dosage range between about 0.1 and 100 mg/kg/day, preferably between about 1 and 50 mg/kg/day, especially between about 3 and 30 mg/kg/day. The animals may either be on a standard or high cholesterol diet and serum total cholesterol is determined in orbital blood before and after treatment. In addition serum glyceride glycerol can be determined in rats after a 20 hours fast and their liver histologically examined. Besides the abovementioned utility, the compounds of this invention are also useful intermediates in the preparation of other valuable products, especially of pharmacologically active compounds.

Particularly useful are the compounds of Formula I, in which R is 1- or 2-decahydronaphthyl, 2- or 7-norbornanyl, mono-di- or tri-(lower alkyl)-decahydro-1- or 2-naphthyl or -2- or 7-norbornanyl, Ph is 1,3- or 1,4-phenylene, (lower alkyl)-1,3- or 1,4-phenylene, (lower alkoxy)-1,3- or 1,4-phenylene, (halogeno)-1,3- or 1,4-phenylene, (trifluoromethyl)-1,3- or 1,4-phenylene or (di-lower alkylamino)-1,3- or 1,4-phenylene and A is lower alkylene or alkenylene, the lower alkyl, lower alkoxy-lower alkyl, di-lower alkylamino-lower alkyl, lower alkyleneimino-lower alkyl, mono-aza-, oxa- or thia-lower alkyleneimino-lower alkyl esters, the amide, mono- or di-lower alkylamides, lower alkyleneimino-amides or mono-aza-, oxa- or thia-lower alkyleneiminoamides, wherein two heteroatoms are separated by at least two carbon atoms, the ammonium, alkali metal, alkaline earth metal and acid addition salts thereof.

Preferred compounds of the invention are those of Formula II

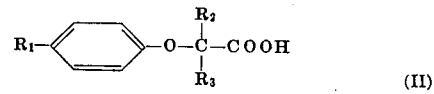

$$(II)$$

in which $R_1$ is 1- or 2-decahydronaphthyl, 2- or 7-norbornanyl, each of $R_2$ and $R_3$ is hydrogen or methyl, the lower alkyl or di-lower alkylamino-lower alkyl esters thereof wherein 2 heteroatoms are separated by at least 2 carbon atoms, the amide,mono- or di-lower alkylamides, ammonium and alkali metal salts thereof and therapeutically acceptable acid addition salts of the di-lower alkylamino-lower alkyl esters.

Especially valuable are those compounds of Formula II in which $R_1$ is 1- or 2-decahydronaphthyl and each of $R_2$ and $R_3$ is methyl which, when given at oral doses between about 1 and 100 mg/kg/day to rats or about 1 and 30 mg/kg/day to dogs, show outstanding hypocholesterolemic effects.

The compounds of this invention are prepared according to methods known per se. For example, they are obtained by:
a. converting in a compound of the formula $$R—Ph—X$$

in which X is a substituent capable of being converted into the group -O-A-Y, wherein Y is a free or functionally converted carboxyl group, the substituent X into said group or
b converting in a compound of the formula $$Z—Ph—O—A—Y$$

in which Z is a substituent capable of being converted into R, the substituent Z into R and if desired, converting any resulting compound into another compound of the invention.

In the starting material mentioned under item (a), X may be converted into the group —O—A—Y in one step or in stages. A particular suitable substituent X is the hydroxy group. The conversion of the corresponding phenolic intermediate into the desired final product is carried out, for example, by converting the phenol first into a salt, particularly a metal salt, such as an alkali metal, e.g. lithium, sodium or potassium salt, for example, with the use of an alkali metal, its hydroxide, carbonate, hydride, amide, alkoxide or an organic alkali metal compound, e.g. sodium or potassium hydroxide or carbonate, lithium or sodium hydride, sodium or potassium amide, lithium, sodium or potassium methoxide, ethoxide or tert. butoxide, butyl or phenyl lithium. The resulting salt may then be reacted with a reactive ester of the alcohol HO-A-Y, for example that of a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid. The formation of the metal salt may also be carried out in situ, i.e. the corresponding phenol and the reactive ester are reacted together in the presence of a metal salt-forming reagent, e.g. potassium carbonate. The conversion of a free hydroxy group X may also be carried out by reacting the corresponding starting material with the alcohol HO-A-Y in the presence of a disubstituted carbonate, for example, a diaryl e.g. diphenyl carbonate or especially a di-lower alkyl, e.g. dimethyl or diethyl carbonate. This reaction is advantageously carried out at an elevated temperature, ranging between about 100° and 210°, preferably between about 180° and 200°, if desired, in the presence of a transesterification catalyst, e.g. sodium or potassium carbonate or a sodium lower alkanolate and preferably in the absence of a diluent. A further modification of the conversion of a hydroxy group X into the group -O-A-Y comprises the reaction of said phenol with a corresponding aliphatic aldehyde or ketone in the presence of a tri- or tetra-halogenated methane derivative and a strong base. The former is advantageously chloroform, but also, for example, 1,1,1-trichloro-acetone, bromoform, 1,1,1-tribromoacetone, iodoform, chloral, chloral hydrate, bromal or bromal hydrate, and the latter carbon tetrachloride or tetrabromide. The strong base used is particularly an alkali metal hydroxide, e.g. sodium or potassium hydroxide. The reaction is advantageously carried out in the presence of a diluent, which may be furnished by an excess of the aldehyde or ketone reagent. A further substituent X capable of being converted into the group -O-A-Y is that of the formula -O-CO-R$_4$, in which R$_4$ stands for esterified or etherified hydroxy, for example, halogeno, particularly chloro or bromo, or lower alkoxy, e.g. methoxy or ethoxy, as well as phenoxy. The corresponding starting material is reacted with the compound HO-A-Y, advantageously under the conditions previously mentioned for the reaction with the disubstituted carbonates.

In the starting material mentioned under item (b) Z is, for example, bicycloalkenyl or -alkadienyl or α-hydroxy-bicycloalkyl, -alkenyl or -alkadienyl. Such substituent can be converted into R by hydrogenation, preferably with catalytically activated or nascent hydrogen, e.g. hydrogen in the presence of nickel, palladium or paltinum catalysts, or hydrogen generated during electrolysis or the action of metals on acids or alcohols.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl or oxalyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, halides or oxyhalides or other acyl halides in order to obtain the corresponding esters, halides, anhydrides, amides or the nitrile respectively. Resulting amides can be hydrolyzed under acidic or alkaline conditions, e.g. with the use of aqueous mineral and/or carboxylic acids or alkali metal hydroxides, also alcoholized or transaminated. Resulting nitriles likewise can be hydrolyzed or alcoholized, e.g. with the use of concentrated aqueous or alcoholic acids or alkalis or alkaline hydrogen peroxide. A resulting ester, salt or nitrile, containing in α-position at least one hydrogen atom, can be metallized therein, e.g. with the use of alkali metal organic compounds, such as phenyl lithium, triphenylmethyl sodium or sodium amides or alcoholates, and thereupon reacted with reactive esters of lower alkanols. Resulting compounds containing a primary or secondary amino group, can be reacted with a reactive ester of a corresponding alcohol, for example, such mentioned above. Any resulting compound in whcich A is alkenylene can be converted into the corresponding saturated compound, for example, by treatment with catalytically activated or nascent hydrogen.

A resulting acid can also be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-amino-benzoic, anthranilic, 4-hydroxybenzoic, salicylic, aminosalicylic, embonic, nicotinic, methanesulfonic, ethanesulfonic, hydroxyethanesulfonic, ethylene-sulfonic, halogenbenzenesulfonic, toluenesulfonic, naphthalene-sulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l- tartrates or d-α-(1-naphthyl)-ethylamine or l-cinchonidine salts.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, the starting material mentioned under items (a) and (b) is prepared by reacting a corresponding bicycloalkanone with a lower alkoxy-phenyl-Grignard compound, if desired dehydrating or esterifying the resulting alcohol, if desired hydrogenating any resulting dehydration product and hydrolyzing the lower alkoxy group present, advantageously with pyridine hydrochloride, in order to obtain the starting material mentioned under (a). Any resulting unsaturated or α-acyloxy-phenol may then be reacted analogous to item (a). Said phenolic starting materials or intermediates may also be obtained by reacting bicycloalkanols with H—Ph—X or H—Ph—O—A—Y in the presence of an acidic catalyst, such as sulfuric or phosphoric acid or aluminum chloride. Instead of the free phenols (X     OH), also suitable phenol ethers may be chosen, which can be hydrolyzed after the above-mentioned condensations, for example, with pyridine hydrochloride. Resulting phenols in which Ph contains more than one hydroxy group, may be partially etherified, for example, by reacting it with the proper amount of sodium hydroxide, followed by a reactive ester of a lower alkanol, e.g. a lower alkyl bromide, whereby starting material is obtained in which Ph stands, for example, for (lower alkoxy)-phenylene and X for hydroxy. The intermediates so obtained, can also be converted into each other, as shown for the final products.

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols, and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent, of the active ingredients. They are also included within the scope of the present invention.

The following examples are intended to illustrate the invention and are not to be construed as being limitations thereon. Temperatures are given in degrees Centigrade, and all parts wherever given are parts by weight.

EXAMPLE 1

The mixture of 23 g 4-decahydro-1-naphthyl-phenol, 36 g sodium hydroxide and 600 ml acetone is refluxed for five minutes while stirring. Hereupon 14.4 ml chloroform are added during 20 minutes and the mixture refluxed for two hours more. It is filtered, the residue taken up in 300 ml water and the solution acidified with concentrated hydrochloric acid. It is extracted with diethyl ether, the extract washed with water, dried, filtered and evaporated. The residue is taken up in 150 ml hexane, the solution treated with charcoal, filtered and evaporated. The residue is triturated with pentane, to yield the 2-(4-dechydro-1-naphthyl-phenoxy)-isobutyric acid of the formula

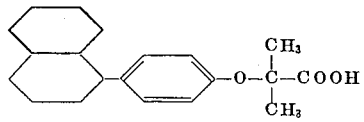

melting at 110°–115°.

The starting material is prepared as follows: To the Grignard reagent, prepared from 9.6 g magnesium chips and 75 g 4-bromo-anisole in 155 ml diethyl ether, the solution of 45.6 g 1-oxo-decahydronaphthalene in 250 ml diethyl ether is added at a rate to maintain reflux and the mixture is refluxed for two hours and stirred over night at room temperature. Hereupon it is cooled in an ice bath, 300 ml 1 N hydrochloric acid are added dropwise and the organic layer separated. It is washed with water, dried, filtered and evaporated. The residue is distilled and the fraction boiling at 125°–150°/0.2 mm Hg collected; it represents the 4-(3,4,5,6,7,8,9,10-octahydro-1-naphthyl)-anisole.

The solution of 52 g thereof in 200 ml glacial acetic acid is hydrogenated over 1.5 g platinum oxide until the theoretical amount of hydrogen has been absorbed. It is filtered, the filtrate evaporated in vacuo, the residue taken up in diethyl ether, the solution washed with water and saturated aqueous sodium bicarbonate, dried, filtered and evaporated. The residue is distilled and the fraction boiling at 120°–140°/0.2 mm Hg collected; it represents the 4-decahydro-1-naphthyl-anisole.

23.5 g thereof are added portionwise to the melt, obtained from 230 ml pyridine and 280 ml concentrated hydrochloric acid at 210°, while stirring and the mixture is refluxed for 30 minutes. It is poured onto 700 g ice, the mixture extracted with diethyl ether, the extract dried, filtered and evaporated. The residue is recrystallized from pentane, to yield the 4-decahydro-1-naphthyl-phenol melting at about 100°–120°.

EXAMPLE 2

The mixture of 19g 4-decahydro-2-naphthyl-phenol, 29.6 g sodium hydroxide and 400 ml acetone is refluxed for 5 minutes while stirring. Hereupon 11.8 ml chloroform are added during 15 minutes and the mixture refluxed for two hours. It is cooled in an ice bath, filtered and the residue dissolved in 200 ml water. The solution is acidified with concentrated hydrochloric acid and extracted with diethyl ether. The extract is washed with water, dried, filtered and evaporated. The residue is recrystallized several times from hexane-pentane, to yield the 2-(4-decahydro-2-naphthyl-phenoxy-isobutyric acid of the formula

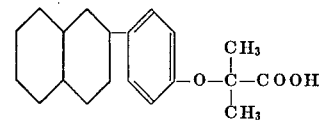

melting at 102°–103°.

The starting material is prepared as follows: To the Grignard reagent, prepared from 14.4 g activated magnesium and 112 g 4-bromo-anisole in 300 ml diethyl ether , the solution of 70 g 2-oxo-decahydronaphthalene in 300 ml diethyl ether is added during 30 minutes while stirring and the mixture is refluxed for three hours and stirred over night at room temperature. It is cooled in an ice bath, 300 ml 1 N hydrochloric acid are added dropwise and the organic layer separated. It is washed with water, dried, filtered and evaporated. The residue is distilled and the fraction boiling at 141°–150°/0.25 mm Hg collected; it represents the 4-(3,4,5,6,7,8,9,10-octahydro-2-naphthyl)-anisole.

The solution of 82.5 g thereof in 400 ml glacial acetic acid is hydrogenated over 2 g 10 percent palladium on charcoal until 824 ml hydrogen have been absorbed. It is filtered, the filtrate evaporated in vacuo, the residue distilled and the fraction boiling at 133°–136°/0.3 mm Hg collected; it represents the 4-decahydro-2-naphthyl-anisole.

23.9 g thereof are added to the melt, prepared from 240 ml pyridine and 295 ml concentrated hydrochloric acid at 210°, while stirring and the mixture is refluxed for 30 minutes. It is poured onto 1 kg ice, the mixture extracted with diethyl ether, the extract dried, filtered and evaporated, to yield the 4-decahydro-2-naphthyl-phenol melting at 90°–98°.

EXAMPLE 3

Preparation of 10,000 tablets each containing 100.0 mg of the active ingredient:

Formula:
2-(4-decahydro-2a-naphthyl-phenoxy)-
isobutyric acid ............ 1,000.00 g
Lactose ................... 2,535.00 g
Corn starch ............... 125.00 g
Polyethylene glycol 6,000 .. 150.00 g
Talcum powder ............. 150.00 g
Magnesium sterate ......... 40.00 g
Purified water ............ q.s.

Procedure

All the powders are passed through a screen with openings or 0.6 mm. Then the drug substance, lactose, talcum, magnesium stearate and half of the starch are mixed in a suitable mixer. The other half of the starch is suspended in 65 ml water and the suspension added to the boiling solution of the polyethylene glycol in 260 ml water. The paste formed is added to the powders which are granulated, if necessary, with an additional amount of water. The granulate is dried overnight at 35°, broken on a screen with 1.2 mm openings and compressed into tablets using concave punches with 10.3 mm diameter, uppers bisected.

I claim:

1. A pharmaceutical composition comprising a hypocholesterolemically effective amount of a compound having the formula R—Ph—O—A—COOH in which R is 1 or 2-decahydronaphthyl or mono-, di- or tri-(lower alkyl)-decahydro-1- or 2-naphthyl, Ph is 1,3 or 1,4-phenylene, or (lower alkyl)-1,3- or 1,4-phenylene, and A is alkylene with up to four carbon atoms or a lower alkyl, di-lower alkylamino-lower alkyl or five or six ring-membered lower alkyleneimino-lower alkyl ester thereof, in both of which the nitrogen atom is separated from the oxygen atom by at least two carbon atoms, or the ammonium, an alkali metal or alkaline earth metal salt of the acid or a therapeutically acceptable acid addition salt of the (di-lower alkylamino or lower alkyleneimino)-lower alkyl esters, together with 50–99 percent thereof of a pharmaceutical excipient.

2. A composition as claimed in claim 1, wherein the pharmaceutically effective compound is that of the formula

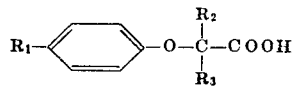

in which $R_1$ is 1- or 2-decahydronaphthyl, each of $R_2$ and $R_3$ is hydrogen or methyl, or a lower alkyl or di-lower alkylamino-lower alkyl ester thereof, wherein two heteroatoms are separated by at least two carbon atoms, an ammonium or alkali metal salt thereof or a therapeutically acceptable acid addition salt of the di-lower alkylamino-lower alkyl esters.

* * * * *

PO-1050
(5/69)

UNITED STATES PATENT OFFICE
CERTIFICATE OF CORRECTION

Patent No. 3,679,800            Dated July 25, 1972

Inventor(s) WILLIAM LASZLO BENCZE

It is certified that error appears in the above-identified patent and that said Letters Patent are hereby corrected as shown below:

Cover page, after "[73] Assignee:" delete "Ciba Corporation, Summit, N. J." and substitute --- CIBA-GEIGY Corporation, a corporation of New York ---.

Signed and sealed this 17th day of September 1974.

(SEAL)
Attest:

McCOY M. GIBSON, JR.            C. MARSHALL DANN
Attesting Officer                Commissioner of Patents aaa